United States Patent [19]

Kitamura et al.

[11] Patent Number: 4,826,729
[45] Date of Patent: May 2, 1989

[54] INSECT PEST-REPELLING FILM OR SHEET

[75] Inventors: Shuji Kitamura, Nagaokakyo; Kiyohiko Nakae, Nishinomiya; Kozo Kotani, Toyonaka; Takanori Kume, Takatsuki; Hideo Negawa, Toyonaka; Tsuneta Ikeda, Saitama, all of Japan

[73] Assignee: Sumitomo Chemical Company, Limited, Osaka, Japan

[21] Appl. No.: 11,198

[22] Filed: Feb. 5, 1987

[30] Foreign Application Priority Data

Aug. 6, 1986 [JP] Japan ................................. 61-185852

[51] Int. Cl.$^4$ ................................................. B32B 9/04
[52] U.S. Cl. ............................... 428/411.1; 428/500; 428/907; 524/413
[58] Field of Search .................. 428/907, 500, 411; 524/413

[56] References Cited

U.S. PATENT DOCUMENTS

| | | | |
|---|---|---|---|
| 4,214,034 | 7/1980 | Kodera et al. | 525/154 |
| 4,220,736 | 9/1980 | Kodera et al. | 525/154 |
| 4,250,661 | 2/1981 | Kodera et al. | 525/154 |
| 4,397,979 | 8/1983 | Reimschuessel | 524/413 |

FOREIGN PATENT DOCUMENTS

| | | |
|---|---|---|
| 1112597 | 3/1956 | France . |
| 55-38369 | 9/1980 | Japan . |
| 1052998 | 12/1966 | United Kingdom . |
| 1058013 | 2/1967 | United Kingdom . |
| 2158833 | 5/1985 | United Kingdom . |

OTHER PUBLICATIONS

J. Amer. Soc. Hort. Sci. 104(6): 759–62 (1979) Schalk et al.

Primary Examiner—Edith Buffalow
Attorney, Agent, or Firm—Birch, Stewart, Kolasch & Birch

[57] ABSTRACT

An insect pest-repelling film or sheet is disclosed, having a reflective spectrum in a ultraviolet region of a wavelength of less than 0.4 μm, particularly a reflective spectrum peak at a wavelength of less than 0.4 μm, a reflective spectrum having not less than 1.4 of a ratio ($R_A/R_B$) of the ultraviolet reflectance ($R_A$) and a visible light reflectance of a wavelength of 0.5 μm ($R_B$) and a visible light transmission of not less than 40%. The film is useful as a cover of houses and tunnels or mulching of ground for crop culture or as a repellent for various insect pests in agriculture, forestry, and gardening.

19 Claims, 2 Drawing Sheets

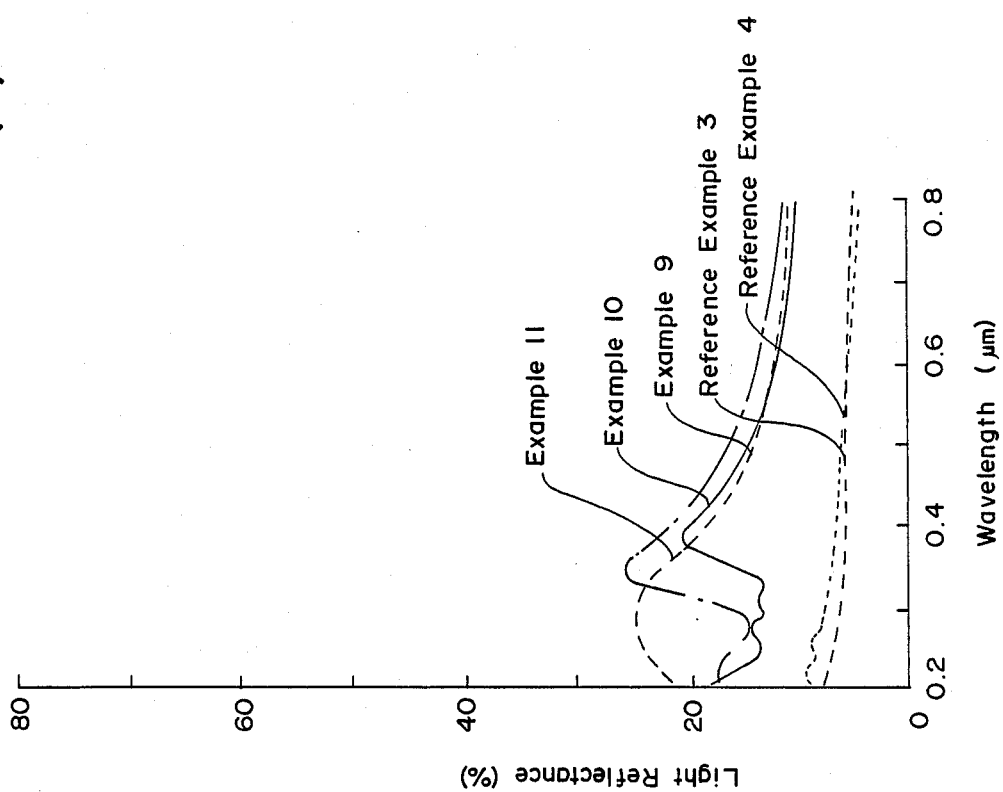
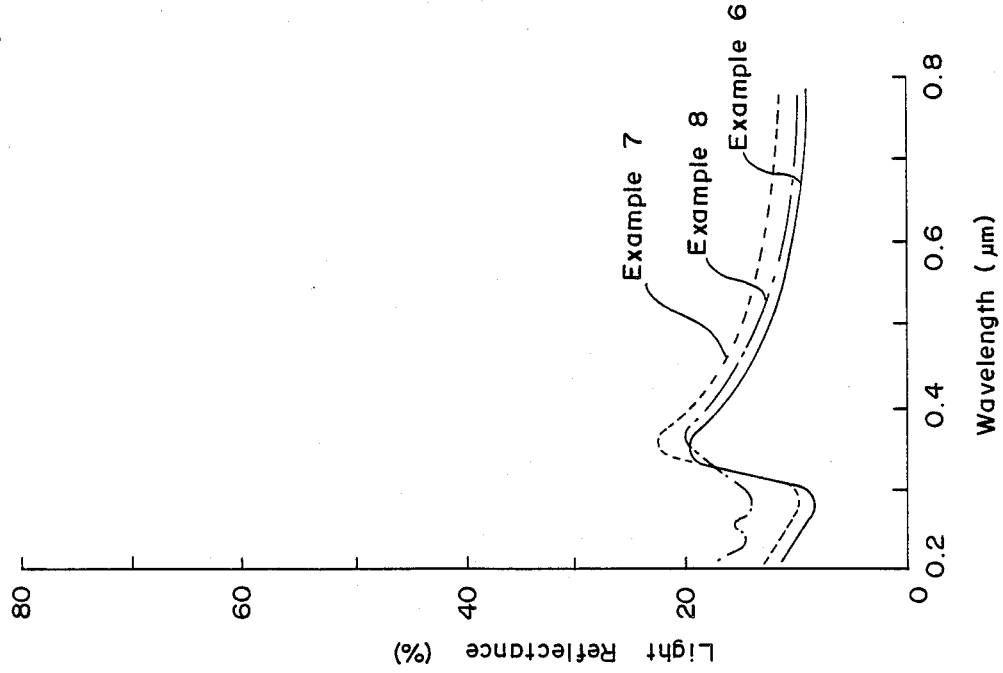

INSECT PEST-REPELLING FILM OR SHEET

This invention relates to an insect pest-repelling film or sheet which is effective for repelling insect pests harmful to various plants such as crops. The invention is useful in agriculture, forestry, and gardening.

BACKGROUND OF THE INVENTION

There have been used various transparent or semi-transparent polyethylene films, ethylene-vinyl acetate copolymer films or soft vinyl chloride resin films for the covering of houses or tunnels or covering ground for crop plantation in the planting of vegetables, flowers, fruit trees, and the like. In covering houses and tunnels, they are used for the purpose of promoting the growth of crops while maintaining the temperature within the houses and tunnels in the low temperature season and of saving energy for heating the houses in the very cold season. The covering of the ground for crop plantation, so-called "mulching", is usually applied to retain moisture in the soil, to raise the undergound temperature, and to prevent loss of fertilizer components, and so on.

With the recent popularity and progress of the above cover culture, there occurs a severe problem of damage to crops by harmful insects. Particularly, in warm regions such as Okinawa, Kyushu and Shuikoku, damage by thrips (e.g. *Thrips palmi*), aphides (e.g. *Aphis gossypii, Mizus persieae*), etc. has become a very severe problem.

In order to remove or prevent such damage, it has been proposed to use agricultural chemicals such as repellents, insecticides, etc. or to trap or catch them with ferromone which is effective for attracting insect pests, or with colored tapes, and some methods have practically been used.

However, these methods have some problems. For instance, agricultural chemicals face a problem of the occurrence of resistant insect pests by the use thereof for a long time, and hence, other chemicals having stronger insecticidal activity must be developed, which results occasionally in an increase of toxicity to humans and secondary pollution such as environmental pollution due to the increased deposition of toxic chemicals in soil, and the like.

There have also been proposed other methods for removal of insect pests without problems as mentioned above, for instance, covering of film having a high reflectivity of sunlight (e.g. an aluminum-deposited film, etc.) on the culture crops or ground, by which the entrance of flying insects is prevented, or by preventing the houses or tunnels from flying insect pests by means of covering the horses and tunnels with a film which can cut off close ultraviolet rays, and some of the methods have already been practiced.

However, among the above methods, the former method entails unfavorably high costs and further is not suitable for covering houses or tunnels because of lower light permeability notwithstanding its high light reflectivity, and even in mulching of culture ground, the underground temperature is slightly raised, and hence, it is not practically used for crop cultures other than some specific utilities which utilize these characteristics. Moreover, although the latter method is excellent for the removal of insect pests within the covered houses and tunnels, it affects the growing of eggplant or coloring of flowers, and hence, it is limited in its applications. Also, it exhibits no effect for the prevention of insect pests in the case of mulching.

SUMMARY OF THE INVENTION

From these viewpoints, the present inventors have extensively studied to develop an improved method suitable for the prevention of insect pests which come flying and are parasitic on crops, and further suitable for the protection of culture crops and the promotion of the growth thereof, and have found that an ultraviolet light having a specific wavelength which is reflected by some specific inorganic compounds is remarkably effective for the prevention of insect pests, and that there can be obtained an excellent insect pests-repelling film or sheet by incorporating such specific inorganic compounds.

An object of the invention is to provide an improved insect pest-repelling film or sheet having a specific reflective peak and spectrum effective for the prevention of insect pests.

Another object of the invention is to provide an insect pest-repelling film or sheet containing a specific compound having specific ultraviolet reflection.

Still another object of the invention is to provide a film or sheet having high visible light transmission property as well as insect pests-repelling effects. These and other objects and advantages of the invention will be apparent to those skilled in the art from the following description.

DETAILED DESCRIPTION OF THE INVENTION

Figure 1B:
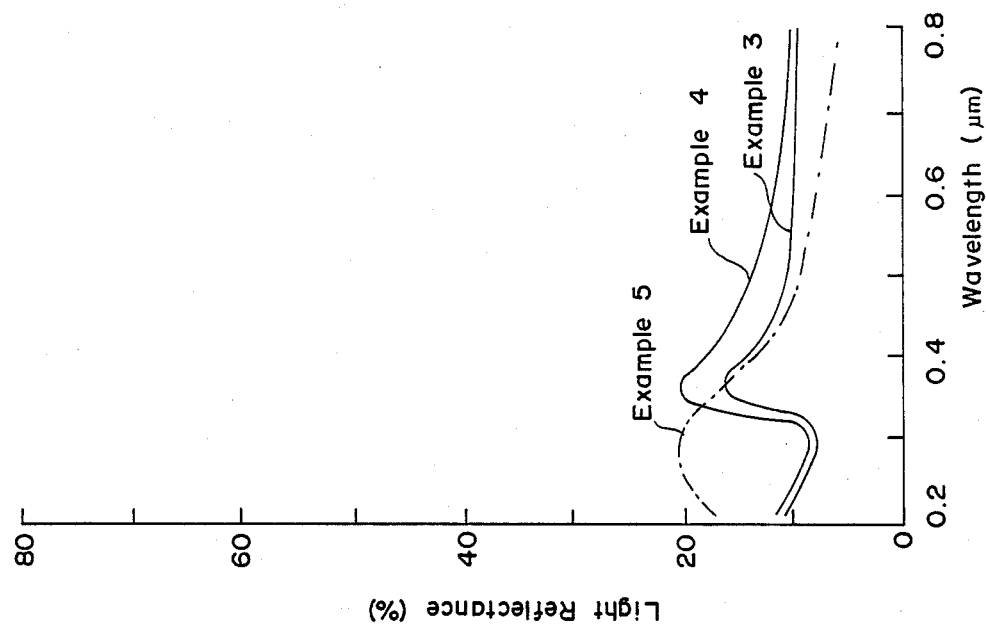
FIG. 1-*a*, FIG. 1-*b*, FIG. 1-*c* and FIG. 1-*d* each depict a graph of ultraviolet reflectance and visible light reflectance, respectively, at wavelength of 0.2 to 0.8 μm of the films produced in Examples of this invention and those in the Reference Examples for purposes of comparison.

This invention provides an insect pest-repelling film or sheet which has a reflective spectrum in a ultraviolet region of a wavelength of less than 0.4 μm, particularly a reflective spectrum peak at a wavelength of less than 0.4 μm, a reflective spectrum having not less than 1.4 of a ratio ($R_A/R_B$) of the ultraviolet reflectance ($R_A$) and the visible light reflectance of a wavelength of 0.5 μm ($R_B$) and a visible light transmission of not less than 40%.

The starting resin used for the film or sheet of this invention includes all kinds of conventional thermoplastic resins. Suitable examples of the resin are ethylene homopolymer or copolymers such as low-density polyethylene, high-density polyethylene, ethylene-butene-1 copolymers, ethylene-4-methylpentene-1 copolymers, ethylene-vinyl acetate copolymers, ethylene-acrylic acid copolymers, ethylene-methyl methacrylate copolymers, ethylene-vinyl acetate-methyl methacrylate copolymers, ethylene-ethyl acrylate copolymers, etc.; polypropylene; vinyl chloride resins; and the like. These resins may be used alone or in a combination of two or more thereof.

The insect pest-repelling film or sheet of this invention includes any kinds of films or sheets having the specific ultraviolet and visible light reflective spectra as mentioned above, and can be prepared by incorporating a specific inorganic compound having such reflective spectra into the resins as mentioned above.

The inorganic compound used in the present invention includes all compounds having an ultraviolet reflectance in a wavelength of less than 0.4 μm and preferably having a reflective peak in this region, and the film or sheet incorporated with the inorganic compound has such reflective spectrum characteristics that a ratio ($R_A/R_B$) of the ultraviolet reflectance of a wavelength of less than 0.4 μm ($R_A$) and the visible light reflectance of a wavelength of 0.5 μm ($R_B$) is not less than 1.4, more preferably not less than 1.6. When the ratio of $R_A/R_B$ is less than 1.4, the film or sheet does not exhibit sufficient insect pest-repelling effects. Furthermore, the film or sheet incorporated with the inorganic compound has preferably a visible light transmission of not less than 40%, more preferably not less than 60%. The high visible light transmission is particularly important in view of the growth of plants when the film or sheet is used as a cover for houses or tunnels.

The inorganic compounds used in the invention include any kinds of compounds satisfying the above-mentioned conditions, for example, titanate compounds such as potassium titanate, calcium titanate, magnesium titanate, barium titanate, strontium titanate, lithium titanate, and aluminum silicate titanate, etc.; zirconium compounds such as zirconium silicate, zirconium oxide, and the like. Among these compounds, potassium titanate, barium titanate, aluminum silicate titanate, zirconium silicate and zirconium oxide are particularly preferable because they satisfy both the high ultraviolet reflectance (high $R_A/R_B$ ratio) and the high visible light transmission requirement.

The aluminum silicate titanate used in this invention means a compound oxide having a formula:

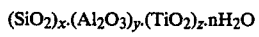

$$(SiO_2)_x \cdot (Al_2O_3)_y \cdot (TiO_2)_z \cdot nH_2O$$

wherein n is 0 or a positive integer, which has a $TiO_2$ content of 1 to 15% by weight, preferably 1.5 to 8.0% by weight. When the $TiO_2$ content in the above compound oxide is smaller than the above lower limit, it unfavorably shows less ultraviolet reflectance, but on the other hand, when the $TiO_2$ content is over the above upper limit, it causes an unfavorable lowering of the light transmission property.

The inorganic compounds may be used in any form of powder or whiskers, but are preferably in the form of whisker in view of the excellent strength and light reflective characteristics of the film or sheet. The amount of the inorganic compounds is not specified but may be in any range that the above-mentioned conditions are satisfied, but is preferably in the range of 0.2 to 20% by weight, more preferably 0.5 to 5% by weight, based on the whole weight of the film or sheet, in view of the higher ultraviolet reflectance without a substantial decrease of the visible light transmission.

The film or sheet of this invention can be prepared, for example, by the following steps.

A thermoplastic resin composition containing an inorganic compound is mixed and kneaded with a conventional Banbury mixer, two roll kneader or extruding kneader, in which the resin is molten and the powdery inorganic compound etc. are mixed well. The kneaded composition thus prepared is formed into a film or sheet with a conventional processing machine as usually used in blown film processing, T-die film or sheet processing, calender processing, and the like.

The film or sheet of this invention may be a single layer film or sheet or a laminate film or sheet, i.e. a two layer or three layer laminate film or sheet, wherein a transparent layer of a thermoplastic resin is provided on at least one face of the film or sheet containing an inorganic compound. The laminate film or sheet can be prepared by extruding separately a resin composition containing an inorganic compound and a transparent composition of a thermoplastic resin from two extruders provided with a two layer extruder die to a prepare two layer film or sheet, or by extruding separately a resin composition containing an inorganic compound as the intermediate layer and two transparent thermoplastic resin compositions as inner and outer layers on both faces of the intermediate layer with two extruders provided with three layer extruder dies to prepare a three layer film or sheet.

In these two layer or three layer laminate films or sheets, the resin for the transparent resin layers may be the same as or different from the resins for incorporating inorganic compounds.

The insect pest-repelling film of this invention is preferably made in the most suitable thickness by taking into consideration the balanced insect pest-repelling activity and economy and also easier handling, and is preferably in the range of 20 to 100 μm. In the case of a two or three layer laminate film having a transparent film layer, the film containing an inorganic compound has preferably a thickness of 5 to 50 μm and the whole thickness of the film is preferably in the range of 10 to 100 μm. However, in the case of the insect pest-repelling sheet, the thickness is not necessarily restricted to a specific range, but may be in any range suitable for the required utilities.

In the case of a utility wherein the visible light permeation is not necessarily required, the insect pest-repelling film is adhered onto a resin sheet, a wooden sheet, paper, cloth, and the like, and when a transparent sheet is required, the film is adhered onto a tranparent resin sheet, glass plate, etc.

The insect pest-repelling film or sheet of this invention has an ultraviolet reflectivity in a specific wavelength and hence exhibits a repelling effect against various insect pests such as thrips (e.g. *Thrips palmi*), aphides (e.g. *Aphis gossypii*, *Mizus persieae*), etc., and can be used as a cover of houses and tunnels or mulching of ground for crop culture or as a repellent for various insect pests in agriculture, forestry, and gardening.

This invention is illustrated by the following examples but should not be construed to be limited thereto.

EXAMPLE 1

| Ingredients | Amount |
|---|---|
| Low-density polyethylene [density: 0.924 g/cm³, melt index (MI): 1.5 g/10 min.] | 100 parts by weight |
| Potassium titanate whisker (Tismo ® D, K₂O.6TiO₂, manufactured by Otsuka Kagaku K. K.) | 2 parts by weight |
| Glycerine monostearate | 0.5 parts by weight |

To a mixture of the above ingredients is added a hindered amine light stabilizer (Tinuvin 622, manufactured by Ciba-Geigy, 0.1 part by weight), and the mixture is kneaded with a 5 liter Banbury mixer at a resin temperature of 150°–160° C. for 10 minutes and then extruded with an extruder to prepare granular pellets (the resulting composition is hereinafter referred to as "Resin Composition A").

The Resin Composition A is processed with a blown film processing machine under the conditions of a melting zone of 180° C. and a die temperature of 180° C. to give a film having a thickness of 30 μm.

The physical properties and activities of the film were tested. The results are shown in the accompanying FIG. 1-a and Tables 1 and 2.

EXAMPLE 2

In the same manner as described in Example 1 except that an ethylene-butene-1 copolymer (density: 0.925 g/cm$^3$, MI: 2 g/10 min.) is used instead of the low-density polyethylene, there is obtained a film having a thickness of 20 μm.

Figure 1A:
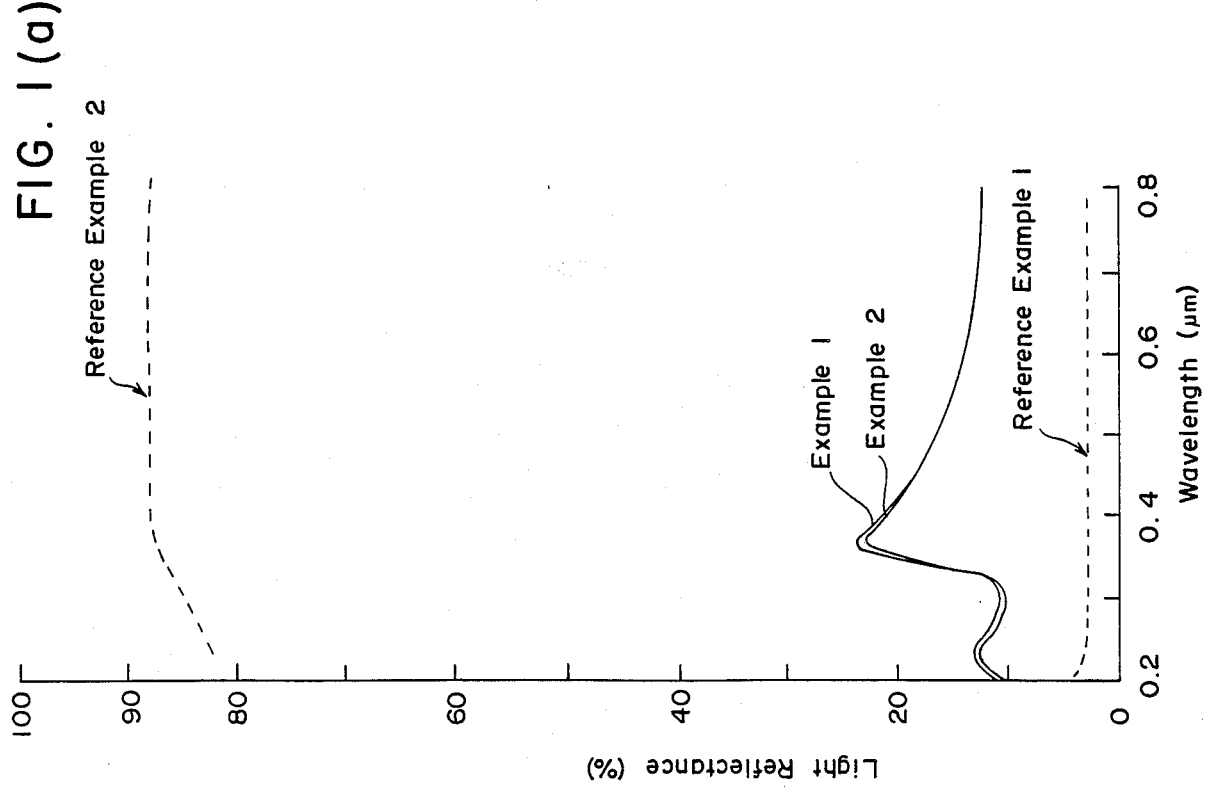

The physical properties and activities of the film were tested, and the results are shown in FIG. 1-a and Tables 1 and 2.

EXAMPLE 3

| Ingredients | Amount |
| --- | --- |
| Ethylene-butene-1 copolymer [density: 0.925 g/cm$^3$, MI: 2 g/10 min.] | 100 parts by weight |
| Potassium titanate whisker (Tismo ® D, K$_2$O.6TiO$_2$, manufactured by Otsuka Kagaku K. K.) | 5 parts by weight |
| Glycerine monostearate | 0.8 parts by weight |

To a mixture of the above ingredients is added a hindered amine light stabilizer (Tinuvin 622, manufactured by Ciba-Geigy, 0.1 part by weight), and the mixture is treated in the same manner as described in Example 1 to give granular pellets (the resulting composition is hereinafter referred to as "Resin Composition B").

In the same manner as described above by using the same ethylene-butene-1 copolymer as used above but no potassium titanate whisker, there are prepared granular pellets (the composition is referred to as "Resin Composition C").

These resin compositions are processed by using a two layer blown film processing machine provided with two extruders and two layer dies. That is, the Resin Composition B and Resin Composition C are separately entered into two extruders and processed under the conditions of a melting zone of 220° C. and a die temperature of 200° C. wherein the Resin Compositions B and C are molten and adhered each other to give a two layer laminate film having a thickness ratio of B/C of 1/1 and a total thickness of 30 μm.

The physical properties and activities of the film were tested wherein the laminate film was set so that the layer of the Resin Composition B became outside. The results are shown in the accompanying FIG. 1-a and Tables 1 and 2.

EXAMPLE 4

The Resin Composition B and Resin Composition C as obtained in Example 3 are processed with a multilayer blown film processing machine provided with two kinds of three layer dies, wherein the Resin Composition B is supplied as the intermediate layer under the conditions of a melting zone of 190° C. and a die temperature of 200° C. and the Resin Composition C is supplied as the inner and outer layers under the conditions of a melting zone of 190° C. and a die temperature of 190° C. wherein each resin composition thus supplied is adhered to each other within the dies to give a three layer laminate film having a thickness of the inner layer of 5 μm, intermediate layer of 10 μm and outer layer of 5 μm and a total thickness of 20 μm.

The physical properties and activities of the film were tested. The results are shown in FIG. 1-b and Tables 1 and 2.

EXAMPLE 5

In the same manner as described in Example 1 except that zirconium silicate (A-PAX ®, ZrO$_2$ 65.7 wt.% and SiO$_2$ 33.3 wt.%, manufactured by Kinsei Kogyo K.K., 5 part by weight) is used instead of potassium titanate whisker, there is obtained a film having a thickness of 50 μm.

The physical properties and activities of the film were tested, and the results are shown in FIG. 1-b and Tables 1 and 2.

EXAMPLE 6

In the same manner as described in Example 1 except that powdery potassium titanate having an average particle size of 2.5 μm (K$_2$O.6TiO$_2$, manufactured by Kubota Tekko K.K., 5 parts by weight) is used instead of potassium titanate whisker, there is obtained a film having a thickness of 50 μm.

The physical properties and activities of the film were tested, and the results are shown in FIG. 1-c and Tables 1 and 2.

EXAMPLE 7

In the same manner as described in the preparation of Resin Composition B in Example 3 except that calcium titanate (RC-17, Ca.TiO$_3$, manufactured by Sumitomo Chemical Co., Ltd., 5 parts by weight) is used instead of potassium titanate whisker, there is prepared a resin composition (hereinafter referred to as "Resin Composition D").

In the same manner as described in Example 4 except that Resin Composition D and Resin Composition C are used instead of Resin Compositions B and C, there is prepared a three layer laminate film having a thickness of the inner layer of 10 μm, the intermediate layer of 30 μm and the outer layer of 10 μm and a total thickness of 50 μm.

The physical properties and activities of the film were tested likewise. The results are shown in FIG. 1-c and Tables 1 and 2.

EXAMPLE 8

In the same manner as described in the preparation of Resin Composition B in Example 3 except that aluminum silicate titanate (a compound oxide analyzed SiO$_2$ 51 wt.%, Al$_2$O$_3$ 42 wt.% and TiO$_2$ 2.5 wt.%, manufactured by Sumitomo Chemical Co., Ltd., 7 parts by weight) is used instead of potassium titanate whisker, there is prepared a resin composition (hereinafter referred to as "Resin Composition E").

In the same manner as described in Example 4 except that Resin Composition E and Resin Composition C are used instead of Resin Compositions B and C, there is prepared a three layer laminate film having a thickness of the inner layer of 10 μm, the intermediate layer of 30 μm and the outer layer of 10 μm and a total thickness of 50 μm.

The physical properties and activities of the film were tested likewise. The results are shown in FIG. 1-c and Tables 1 and 2.

REFERENCE EXAMPLE 1

By using the Resin Composition C as used in Example 3 alone, there is a single layer transparent blown film having a thickness of 30 μm.

The physical properties and activities of this film were tested. The results are shown in FIG. 1-a and Tables 1 and 2.

REFERENCE EXAMPLE 2

As to a commercially available aluminum-deposited polyethylene film (manufactured by Reiko K.K., thickness: 50 μm), the physical properties and activities were tested. The results are shown in FIG. 1-a and Tables 1 and 2.

The physical properties and activities of films in the above Examples 1 to 8 and Reference Examples 1 to 2 were tested in the following manner.

(1) Total light transmission:

The total light transmission of films was measured with a haze tester (manufactured by Toyo Seiki K.K.).

(2) Reflectance of ultraviolet and visible light:

The ultraviolet and visible light reflectances of the films were measured with an automatic recording spectrophotometer (type 330, manufactured by Hitachi Ltd.).

(3) Insect pest-repelling effects:

A mulching of the film was applied onto a ridge (width: 1 m, length: 10 m, height: 20 cm) where a cucumber was planted, and the number of *Thrips palmi* or *Aphis gossypii* (per 40 leaves) was counted for 30 days in summer season.

(4) Growth of crops:

In the same mulching of the film as used in the test of insect pests-repelling effects, the degree of growth of cucumber was measured. The degree of good crop was evaluated in comparison with that in the ridge onto which no mulching of the film was applied (the degree of the latter being counted as 100).

TABLE 1

| | (Physical properties of film) | | | | | | | | | |
|---|---|---|---|---|---|---|---|---|---|---|
| | Examples | | | | Ref. Ex. | | Examples | | | |
| | 1 | 2 | 3 | 4 | 1 | 2 | 5 | 6 | 7 | 8 |
| Total light transmission (%) | 71 | 70 | 66 | 82 | 92 | 0 | 75 | 84 | 84 | 86 |
| Ultraviolet reflective peak wavelength (μm) | 0.37 | 0.37 | 0.37 | 0.37 | — | — | 0.3 | 0.36 | 0.36 | 0.37 |
| Ultraviolet reflectance $R_A$ (%) | 24 | 23 | 16.5 | 21 | 3 | 88 | 20.5 | 20 | 23 | 20 |
| Reflectance at wavelength 0.5 μm $R_B$ (%) | 16 | 16 | 10 | 13 | 3 | 87 | 8.5 | 13 | 16 | 14 |
| $R_A/R_B$ | 1.50 | 1.44 | 1.65 | 1.62 | 1.00 | 1.01 | 2.41 | 1.54 | 1.44 | 1.43 |

TABLE 2

| | (Activities of the film) | | | | | | | | | |
|---|---|---|---|---|---|---|---|---|---|---|
| | Examples | | | | Ref. Ex. | | Examples | | | |
| | 1 | 2 | 3 | 4 | 1 | 2 | 5 | 6 | 7 | 8 |
| Insect pests-repellency: | | | | | | | | | | |
| *Thrips palmi* (number/40 leaves) | 106 | 92 | 83 | 78 | 364 | 38 | 99 | 102 | 92 | 86 |
| *Aphis gossypii* (number/40 leaves) | 121 | 88 | 105 | 101 | 408 | 21 | 111 | 130 | 96 | 97 |
| Growth of crop Degree of good crop (%) | 140 | 155 | 155 | 160 | 120 | 120 | 160 | 140 | 160 | 160 |

EXAMPLE 9

In the same manner as described in Example 4 using the Resin Composition B and Resin composition C except that the thickness of each layer is changed, there is prepared a three layer laminate film having a thickness of the inner layer of of 18.5 μm, the intermediate layer of 38 μm and the outer layer of 18.5 μm and a total thickness of 75 μm.

The physical properties and activities of the film were tested likewise. The results are shown in FIG. 1-d and Tables 3 and 4.

EXAMPLE 10

In the same manner as described in the preparation of Resin Composition B in Example 3 except that aluminum silicate titanate (a compound oxide analyzed SiO₂ 52.4 wt.%, Al₂O₃ 40.2 wt.% and TiO₂ 1.8 wt.%, manufactured by Sumitomo Chemical Co., Ltd., 12 parts by weight) is used instead of potassium titanate whisker, there is prepared a resin composition (hereinafter referred to as "Resin Composition F").

In the same manner as described in Example 4 except that Resin Composition F and Resin Composition C are used instead of Resin Compositions B and C, there is prepared a three layer laminate film having a thickness of the inner layer of 15 μm, the intermediate layer of 45 μm and the outer layer of 15 μm and a total thickness of 75 μm.

The physical properties and activities of the film were tested likewise. The results are shown in FIG. 1-d and Tables 3 and 4.

EXAMPLE 11

In the same manner as described in the preparation of Resin Composition B in Example 3 except that zirconium silicate (A-PAX ®, $ZrO_2$ 65.7 wt.% and $SiO_2$ 33.3 wt.%, manufactured by Kinsei Kogyo K.K., 6 parts by weight) is used instead of potassium titanate whisker, there is prepared a resin composition (hereinafter referred to as "Resin Composition G").

In the same manner as described in Example 4 except that Resin Composition G and Resin Composition C are used instead of Resin Compositions B and C, there is prepared a three layer laminate film having a thickness of the inner layer of 15 μm, the intermediate layer of 45 μm and the outer layer of 15 μm and a total thickness of 75 μm.

The physical properties and activities of the film were tested likewise. The results are shown in FIG. 1-d and Tables 3 and 4.

REFERENCE EXAMPLE 3

By using the Resin Composition B as used in Example 3 alone, there is a single layer transparent blown film having a thickness of 75 μm.

The physical properties and activities of the film were tested likewise. The results are shown in FIG. 1-d and Tables 3 and 4.

REFERENCE EXAMPLE 4

In the same manner as described in the preparation of Resin Composition B in Example 3 except that aluminum silicate (Kaolin clay, $SiO_2$ 46 wt.% and $Al_2O_3$ 37 wt.%, 12 parts by weight) is used instead of potassium titanate whisker, there is prepared a resin composition (hereinafter referred to as "Resin Composition H").

In the same manner as described in Example 4 except that Resin Composition H and Resin Composition C are used instead of Resin Compositions B and C, there is prepared a three layer laminate film having a thickness of the inner layer of 15 μm, the intermediate layer of 45 μm and the outer layer of 15 μm and a total thickness of 75 μm.

The physical properties and activities of the film were tested likewise. The results are shown in FIG. 1-d and Tables 3 and 4.

As to the films as prepared in the above Examples 9 to 11 and Reference Examples 3 to 4, the total light transmission and reflectance of ultraviolet and visible light were tested in the same manner as described hereinbefore. In addition, insect pests-repelling effects and growth of crops were tested in the following manner.

(1) Insect pest-repelling effects:

A mulching of a black polyethylene film was applied onto a ridge (width: 180 cm, length: 25 m, height: 20 cm) where a melon was planted. Thereafter, the laminate film of the above Examples and Reference Examples was applied in a manner of covering thereon in the form of a tunnel, and the number of *Aphis gossypii* (alar insect) and *Thrips palmi* (imago and larva) which flew into the tunnel (per 40 leaves of melon) were counted for 30 days in spring season.

(2) Growth of crops:

In the same cover in the form of a tunnel of the laminate film as used in the test of insect pest-repelling effects, the degree of growth of melon was measured. The degree of good crop was evaluated in comparison with that in the ridge onto which no cover of the laminate film was applied (the degree of the latter being counted as 100).

TABLE 3

| (Physical properties of film) | Examples | | | Ref. Ex. | |
|---|---|---|---|---|---|
| | 9 | 10 | 11 | 3 | 4 |
| Total light transmission (%) | 85 | 89 | 87 | 91 | 90 |
| Ultraviolet reflective peak wavelength (μm) | 0.37 | 0.38 | 0.30 | — | — |
| Ultraviolet reflectance $R_A$ (%) | 26 | 21 | 26 | 8 | 9 |
| Reflectance at wavelength 0.5 μm $R_B$ (%) | 16 | 14 | 15 | 7 | 7 |
| $R_A/R_B$ | 1.63 | 1.50 | 1.73 | 1.14 | 1.29 |

TABLE 4

| (Activities of the film) | Examples | | | Ref. Ex. | |
|---|---|---|---|---|---|
| | 9 | 10 | 11 | 3 | 4 |
| Insect pests-repellency: | | | | | |
| *Thrips palmi* | | | | | |
| (number/40 leaves) | 32 | 58 | 46 | 244 | 266 |
| *Aphis gossypii* | | | | | |
| (number/40 leaves) | 19 | 36 | 30 | 118 | 109 |
| Growth of crop Degree of good crop (%) | 172 | 158 | 166 | 122 | 120 |

What is claimed is:

1. An insect pest-repelling film or sheet which has a reflective spectrum peak at a wavelength of less than 0.4 μm, and a reflective spectrum having at least 1.4 of a ratio ($R_A/R_B$) of the ultraviolet reflectance ($R_A$) and the visible light reflectance of a wavelength of 0.5 μm ($R_B$).

2. The insect pest-repelling film or sheet according to claim 1 which has a visible light transmission of at least 40%.

3. The insect pest-repelling film or sheet according to claim 1 which has an $R_A/R_B$ ratio of at least 1.6 and a visible light transmission of at least 60%.

4. The insect pest-repelling film or sheet according to claim 1, which comprises a thermoplastic resin composition incorporated with an inorganic compound.

5. The insect pest-repelling film or sheet according to claim 4, wherein the inorganic compound is a titanate compound.

6. The insect pest-repelling film or sheet according to claim 4, wherein the inorganic compound is a zirconium compound.

7. The insect pest-repelling film or sheet according to claim 4, which comprises a layer of a resin composition containing at least one inorganic compound and at least one transparent layer of a resin composition on at least one face of the layer of the inorganic compound-containing resin composition.

8. The insect pest-repelling film of claim 4, wherein said thermoplastic resin is a member selected from the group consisting of low-density polyethylene, high-density polyethylene, ethylene-butene-1 copolymers, ethylene-4-methylpentene-1 copolymers, ethylene-vinyl acetate copolymers, ethylene-acrylic acid copolymers, ethylene-methyl methacrylate copolymers, ethylene-vinyl acetate-methyl methacrylate copolymers, polypropylene, vinyl chloride resins, and combinations thereof.

9. The insect pest-repelling film of claim 5, wherein said titanate compound is a member selected from the group consisting of potassium titanate, calcium titanate, magnesium titanate, barium titanate, strontium titanate, lithium titanate, and aluminum silicate titanate.

10. The insect pest-repelling film of claim 6, wherein said zirconium compound is a member selected from the group consisting of zirconium silicate and zirconium oxide.

11. The insect pest-repelling film of claim 4, wherein the inorganic compound is in the form of a whisker or powder.

12. The insect pest-repelling film of claim 4, wherein the organic compound is present in an amount of 0.2 to 20% by weight based on the total weight of the film or sheet.

13. The insect pest-repelling film of claim 7, which comprises a layer of resin composition containing at least one inorganic compound and a transparent layer of a resin composition on each face of said layer of said inorganic compound-containing resin composition.

14. The insect pest-repelling film of claim 1, which has a thickness of 20 to 100 $\mu$m.

15. The insect pest-repelling film of claim 4, which has a thickness of 20 to 100 $\mu$m.

16. The insect pest-repelling film of claim 7, wherein said film containing an inorganic compound has a thickness of 5 to 50 $\mu$m and the total thickness of the film is 10 to 100 $\mu$m.

17. The insect pest-repelling film of claim 13, wherein said film containing an inorganic compound has a thickness of 5 to 50 $\mu$m and the total thickness of the film is 10 to 100 $\mu$m.

18. A method for repelling insects from a given area, which comprises covering said area with the film or sheet of claim 1.

19. A method for repelling insects from a given area, which comprises covering said area with the film or sheet of claim 4.

* * * * *